March 31, 1964  R. BECKADOLPH  3,126,936
PNEUMATIC TIRE WITH ANNULAR REINFORCEMENT
Filed Dec. 19, 1960

INVENTOR
RICHARD BECKADOLPH
BY
Patent Agent

Patented Mar. 31, 1964

3,126,936
PNEUMATIC TIRE WITH ANNULAR
REINFORCEMENT
Richard Beckadolph, Hannover, Germany, assignor to
Continental Gummi-Werke Aktiengesellschaft, Hannover, Germany
Filed Dec. 19, 1960, Ser. No. 76,769
Claims priority, application Germany Dec. 21, 1959
7 Claims. (Cl. 152—341)

The present invention relates to a pneumatic tire with a substantially hollow cylindrical annular reinforcement for increasing the lateral stability.

With heretofore known tires of the above identified type, which are also called belted tires, the annular reinforcement forms a component of the tire body proper and is arranged between the tread surface and the carcass of the tire.

Inasmuch as the hollow cylindrical annular reinforcement or belt is composed substantially of pull-resistant threads, bands, or the like, it is unavoidable that it will stiffen the zenith portion or crown of the tire when the vehicle yields in vertical direction or when forces occur which act in a direction perpendicular to the tread surface.

It is, therefore, an object of the present invention to provide a tire of the above mentioned general character, which will avoid the stiffening of the zenith portion or crown of the tire.

It is another object of this invention to provide a pneumatic vehicle tire with an annular reinforcement, which will assure not only a lateral stabilization of the tire but also a soft cushioning under the effect of forces acting in a direction perpendicular to the tread surface, thereby increasing the driving comfort.

These and other objects and advantages of the invention will appear more clearly from the following specification in connection with the accompanying drawing, in which.

The tire construction according to the present invention comprises an inner tire having bead cores, side walls, and a peripheral portion which is substantially flat in cross-section while carcass forming pull resistant reinforcing insert means are anchored on the bead cores and extend from one bead core to the other bead core in radial planes of said inner tire, said inner tire being provided with an annular breaker strip arranged in the peripheral portion of said inner tire in spaced relation to the side walls of said inner tire. The tire construction according to the present invention furthermore comprises an outer tire composed substantially of rubber material only and having its side walls normally in engagement with the major portion of the respective adjacent side walls of said inner tire and extending partially around the bead core portion of said inner tire while the central area of the peripheral portion of said inner tire is normally spaced from the inner surface of the outer tire portion faced by the peripheral portion of the inner tire.

Figure 1:
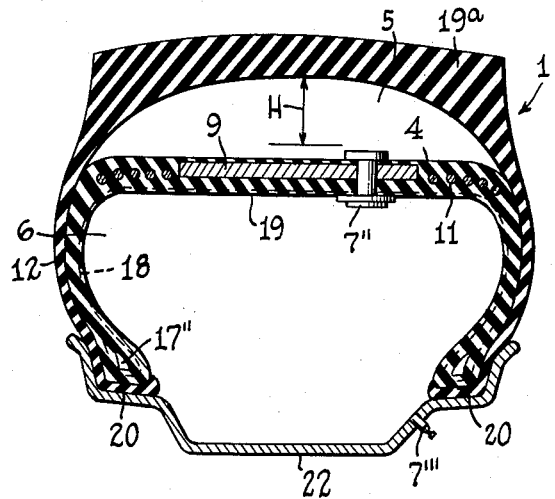
FIG. 1 illustrates a cross section through a portion of a belted tire according to the present invention, in which the belt is embedded within the peripheral portion of a bead equipped inner tire of U-shaped cross section.

More specifically, with regard to FIG. 1 of the drawing, the tire construction generally designated with the reference numeral 1 comprises an inner tire 19 and an outer tire 19a. The inner tire 19 has in its outer peripheral portion mounted a reinforcing belt 4 comprising a circumferential band 9 and threads 11, or the like. This inner tire, which is of substantially U-shaped cross-section, is furthermore provided with bead cores 17" and carcass-like reinforcing inserts 18 anchored to the bead core 17' and extending from bead to bead. This annular body 19 of substantially U-shaped cross-section confines with a metal rim 22 the tire chamber 6 while confining with the outer tire 19a the tire chamber 5. A customary tire valve 7''' extending through the rim 22 is adapted to supply inflating pressure into the tire chamber 6.

Preferably, different pressures are to be provided in chambers 5 and 6 respectively. To this end, various valve arrangements may be provided. Thus, between the two chambers 5 and 6 there may be provided a pressure reducing valve 7".

Inasmuch as the inner pressure prevailing in chamber 6 is absorbed by the reinforcing inserts 18, and since furthermore the pressure in chamber 5 is only relatively low, the outer tire 19a can be produced exclusively of rubber or similar material. The lower edges 20 of the tire body are anchored by clamping the same between the beads 21 and the metal rim 22.

The depression of the outer tire under normal conditions is designated with the reference character H. The reinforcing belt 4 is spaced from the inner peripheral surface of the outer tire 19 in such a way that the outer tire zenith portion 8, when normally deformed, will just touch the radially outer portion of the reinforcing belt 4 or, better, will not yet touch the same. This means that the clear distance between the outer surface of the reinforcing belt 4 and the inner surface of the zenith portion 8 will, in the center, be slightly greater than the normal depression H, as has been clearly shown in FIG. 1.

As mentioned above, adjacent the edge portions of the belt 9, the inner tire 19 has arranged therein reinforcing threads 11 or the like. In this way, those portions of the reinforcing belt 4 which contain the inserts 1 represent elastically deformable portions of the reinforcing belt 4 and are adapted to yield under the effect of mechanical shocks or the like, while exerting a stabilizing effect on the side walls of the outer tire. Thus, the tire structure will be prevented from being damaged by the reinforcing belt due to mechanical effects upon the side walls, for instance, when hitting a curbstone.

The reinforcing belt may be composed of two or more layers of pull resistant threads, bands, cables or the like. According to the invention, such a thread angle is selected that the hollow cylindrical shape of the reinforcing belt 4 will be maintained, for all practical purposes, under the effect of the higher pressure in the inner chamber 6.

Figure 2:
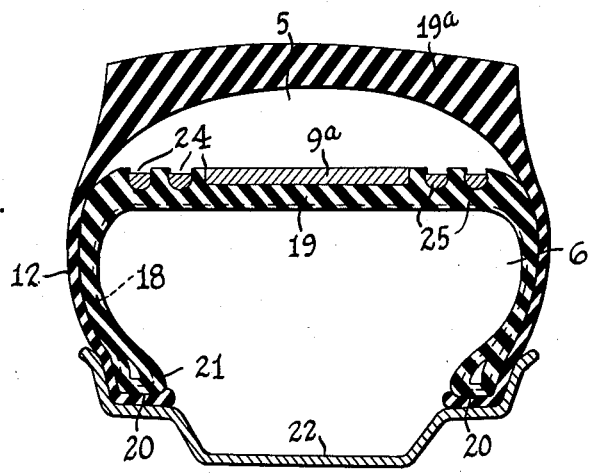
FIG. 2 illustrates a tire according to the invention modified over that of FIG. 1 in that the reinforcing belt is detachably mounted in the periphery of the inner bead equipped tire.

The arrangement of FIG. 2 is very similar to that of FIG. 1 and differs therefrom merely in that the reinforcing band 9a and the reinforcing inserts 24 and 25 are detachably mounted in the periphery of the inner tire 19.

It is, of course, to be understood that the present invention is, by no means, limited to the particular constructions shown in the drawing, but also comprises any modifications within the scope of the appended claims.

It is furthermore to be understood that the term "rubber material" as it appears in the specification and claims covers both natural as well as synthetic rubber and rubberlike material.

What I claim is:

1. In a pneumatic tire construction having a tire body with a crown portion, side walls and beads and confining an annular chamber: a pneumatic tube arranged in said annular chamber and having its peripheral wall portion normally spaced from said crown portion to thereby confine therewith a ring chamber, and reinforcing means embedded in said peripheral wall portion of said pneumatic tube and normally extending approximately from one side wall to the other side wall of said tire.

2. In a pneumatic tire construction having a tire body with a crown portion, side walls and beads and confining an annular chamber: a pneumatic tube arranged in said annular chamber and having its peripheral wall portion normally spaced from said crown portion to thereby confine therewith a ring chamber, said peripheral portion of said pneumatic tube being provided with peripheral grooves, and annular reinforcing means detachably mounted in said annular grooves, said reinforcing means normally substantially extending from one side wall to the other side wall of said tire.

3. In a pneumatic tire construction having a crown portion and side walls and confining an annular chamber: an annular body of substantially U-shaped cross section arranged within said annular chamber and being anchored near the inner ends of said side walls, the peripheral portion of said annular body normally being spaced from said crown portion and being provided with peripheral grooves, and reinforcing means detachably mounted in said peripheral grooves, said reinforcing means normally substantially extending from one side wall to the other side wall of said tire.

4. In a pneumatic tire having a tire body with a crown portion, side walls and a bead section and confining an annular chamber: annular reinforcing means arranged within said annular chamber and being substantially coaxial therewith, said reinforcing means normally being spaced from said crown portion and extending at least approximately from one side wall of said tire body to the other side wall of said tire body, the marginal portions of said reinforcing means adjacent said side walls being hollow.

5. In a pneumatic tire construction having an inner tire provided with bead cores, with side walls, and with a peripheral portion which is substantially flat in cross section; said inner tire having carcass-forming pull-resistant reinforcing insert means anchored on said bead cores and extending from one bead core to the other bead core in radial planes of said inner tire; said inner tire furthermore being provided with an annular breaker strip arranged in said peripheral portion of said inner tire in spaced relation to the side walls of said inner tire; and an outer tire composed substantially of rubber material only and provided with a peripheral tread area and with side walls normally engaging the major portion of the side walls of said inner tire and extending partially around the bead core portions of said inner tire; the central area of the peripheral portion of said inner tire normally being spaced from the inner surface of the outer tire portion faced thereby.

6. In a pneumatic tire construction having an inner tire provided with bead cores, with side walls, and with a peripheral portion which is substantially flat in cross section; said inner tire having carcass-forming pull-resistant reinforcing insert means anchored on said bead cores and extending from one bead core to the other bead core in radial planes of said inner tire; said inner tire furthermore being provided with an annular breaker strip arranged in said peripheral portion of said inner tire in spaced relation to the side walls of said inner tire; an outer tire composed substantially of rubber material only and provided with a peripheral tread area and with side walls normally engaging the major portion of the side walls of said inner tire and extending partially around the bead core portions of said inner tire; the central area of the peripheral portion of said inner tire normally being spaced from the inner surface of the outer tire portion faced thereby; and pull-resistant but deformation permitting reinforcing means arranged in the peripheral portion of said inner tire and located in those peripheral portions of said inner tire which are located between the lateral edges of said breaker strip and the lateral walls of said outer tire.

7. A tire construction according to claim 6, in which said pull-resistant deformation permitting reinforcing means extend into that area of said inner tire where the peripheral portion of said inner tire merges with the side walls thereof.

References Cited in the file of this patent

UNITED STATES PATENTS

| | | |
|---|---|---|
| 2,524,808 | Khalil | Oct. 10, 1950 |
| 2,680,463 | Khalil | June 8, 1954 |
| 2,779,381 | Crossan | Jan. 29, 1957 |
| 2,826,233 | Cooper | Mar. 11, 1958 |
| 2,853,115 | Church | Sept. 23, 1958 |
| 2,898,969 | Pfeiffer | Aug. 11, 1959 |

FOREIGN PATENTS

| | | |
|---|---|---|
| 5,751 | Japan | of 1959 |
| 139,275 | Australia | Nov. 7, 1947 |
| 789,770 | Great Britain | Jan. 29, 1958 |